United States Patent [19]

Shibata et al.

[11] Patent Number: 5,576,376
[45] Date of Patent: Nov. 19, 1996

[54] RUBBER COMPOSITION CONTAINING A CONJUGATED DIENE POLYMER

[75] Inventors: Tadashi Shibata; Ryota Fujio, both of Tokyo, Japan

[73] Assignee: Bridgestone Corporation, Tokyo, Japan

[21] Appl. No.: 219,284

[22] Filed: Mar. 28, 1994

[30] Foreign Application Priority Data

Mar. 26, 1993 [JP] Japan .................................... 5-068294

[51] Int. Cl.$^6$ ................................ C08F 36/00; C08F 8/34
[52] U.S. Cl. ..................... 524/495; 524/526; 525/250; 525/331.9; 525/332.7; 525/333.3
[58] Field of Search .................................... 524/495, 526; 525/250, 331.9, 332.7, 333.3

[56] References Cited

U.S. PATENT DOCUMENTS 5,248,722  9/1993  DeTrano et al. ........................ 524/496
5,268,413  12/1993  Antkowick et al. .................... 524/526

*Primary Examiner*—Paul J. Thibodeau
*Assistant Examiner*—Mary Critharis
*Attorney, Agent, or Firm*—Sughrue, Mion, Zinn, Macpeak & Seas

[57] ABSTRACT

A rubber composition having good physical properties such as breaking properties, wear strength and grip properties, and good processability at the same time is suitable for a high performance tire. A nitrogen containing polymer with a weight average molecular weight of $70 \times 10^4$ to $250 \times 10^4$ is compounded with 60 to 200 phr of carbon black, a softener comprising 30 to 250 phr of a process oil and/or 5 to 100 phr of liquid polymer, and not more than 60 parts of another polymer.

21 Claims, No Drawings

RUBBER COMPOSITION CONTAINING A CONJUGATED DIENE POLYMER

FIELD OF THE INVENTION

The present invention relates to a rubber composition containing a conjugated diene polymer. More specifically, the present invention relates to a rubber composition containing a conjugated diene polymer and a vulcanite formed therefrom which has good breaking strength, good wear strength, and high tanδ.

BACKGROUND OF THE INVENTION

Tires, high performance tires, in particular, have been required to have good maneuverability, as the capability of cars and highway conditions improve. Wear strength, breaking properties, and grip properties, which may be indicated by wear strength, stability at high speed, accelerating capability and breaking capability are the properties most in demand. It has been desired to improve these properties, and, further, those which give priorities to steering properties, good high speed stability and good durability at high speed.

To provide these rubber compositions, the relationship between wet skid resistance or dry grip properties and viscoelasticity of rubber compositions has been studied. It has been found that grip properties can be improved by increasing hysteresis loss value, that is, by increasing tanδ at 50° to 70° C. and by compounding large quantities of extending oil. It has also been found that improvement in wear strength and durability at high speed can be effected by improving tensile strength and elongation at break, both at high temperature, i.e., around 100° C. In this regard, it is known that these properties can be improved by using an existing rubbery polymer or a novel polymer, i.e., by adding such polymers to the tire tread compositions, to make a novel composition.

As examples of the former method, a butyl rubber, (see JPA62-143945), a polynorbornene (see JP-A-62-143945 or see JP-A-2-142838), a polyisoprene (see JP-A-63-132949), or a cumarone-indene resin (see JP-A-62-1735) have been added to a butadiene-styrene polymer (SBR). As examples of the latter method, an SBR has been modified with a diphenylmethyl alcohol iderivative (see JP-A-60-61314), a diblock butadiene-styrene polymer has been used as a rubbery component (see JP-A-1-131258), an SBR has been polymerized using an organolithium compound and certain organic compounds such as potassium butoxide, as a rubbery component (see JP-B-44-20463), and an SBR has been a polymerized using a potassium salt as a randomizer as rubbery component (see JP-A-3-239737).

But, since a lot of extending oil has been used to improve grip properties, processability was deteriorated. So it is now required to improve both these properties and processability at the same time. The conventional methods, even those with controlled compounding, could not provide sufficiently good properties. Moreover, little effort has been put into improvement of processability.

SUMMARY OF THE INVENTION

An object of the present invention is to provide a rubber composition which, when vulcanized, has good breaking strength, wear strength and grip properties, and improved proccessability at compounding.

The rubber composition in accordance with the present invention has a rubber component with at least 40 wt % of a polymer chain of a conjugated diene monomer and an aromatic vinyl hydrocabon monomer wherein said polymer chain has at least one nitrogen-containing group in or at the end of the polymer chain and a weight average molecular weight of $70 \times 10^4$ to $250 \times 10^4$; 60 to 200 parts by weight of carbon black per 100 parts by weight of rubber (phr); and 30 to 250 phr of a process oil and/or 5 to 100 phr of liquid polymer.

The present inventors have carried out an intensive study of the relationship between the microstructure and the properties of the polymer, the effect of the polymer on rubber composition, and compounding formula, and found that the rubber composition described above is the best tread compound with the above discussed properties. This is because the nitrogen atom at the end of the polymer or in the polymer chain increases the interaction between polymer and carbon black as a reinforcing filler after compounding reagents are added and dramatically both the properties and processability.

The polymer used for the present invention must have a nitrogen atom at the end of the polymer or in the polymer chain. The method to introduce the nitrogen atom into the polymer chain is not critical. For example, the monomers can be polymerized in a hydrocarbon solvent using a nitrogen-containing lithium compound as an initiator or the active end of the polymer can be modified after polymerization in a hydrocarbon solvent using an organolithium compound as an initiator.

The nitrogen-containing lithium initiator used for the present invention can be the reaction product of an amine compound and an organolithium compound. The amine compound can be represented as either formula (A) or formula (B):

wherein $R^1$ and $R^2$ may be same or different and each represents an aliphatic hydrocarbon group preferably containing 1 to 20 carbon atoms, an aromatic hydrocarbon group preferably containing 5 to 20 carbon atoms or a cycloaliphatic hydrocarbon group preferably containing 3 to 20 carbon atoms, more preferably, each an aliphatic hydrocarbon group containing 1 to 10 carbon atoms, an aromatic hydrocarbon group containing 5 to 10 carbon atoms or a cycloaliphatic hydrocarbon group containing 3 to 10 carbon atoms:

wherein x is one of the following hydrocarbon groups:
  X-I: a saturated group having the formula $(CR^3R^4)_n$;
  X-II: a saturated group having the formula $(CR^5R^6)_m$-Y-$(CR^5R^6)_1$, wherein Y is $NR^7$ or O;
  X-III: an unsaturated group having a carbon—carbon double bond, preferably having the formula $(CR^3R^4)_n$ or $(CR^5R^6)_m$-Y-$(CR^5R^6)_1$ as described above;
  wherein $R^3$, $R^4$, $R^5$, and $R^6$, which may be the same or different, each independently represents a hydrogen atom, an aliphatic hydrocarbon group preferably containing 1 to 10 carbon atoms, an aromatic hydrocarbon group preferably containing 5 to 10 carbon atoms, and a cycloaliphatic hydrocarbon group preferably containing 3 to 10 carbon atoms, $R^7$ is an aliphatic hydrocarbon group preferably containing 1 to 10 carbon atoms, an aromatic hydrocarbon group preferably containing 5 to 10 carbon atoms, and a cycloaliphatic hydrocarbon group preferably containing 3 to 10 carbon atoms, n is an integer between 3 and 20, and m and 1 are each an integer, the sum of which is from 2 to 9.

DETAILED DESCRIPTION OF THE INVENTION

The term "polymerization" as used herein includes homopolymerization of a conjugated diene compound; polymerization of a conjugated diene compound and an aromatic vinyl compound; as well as homopolymerization of an aromatic vinyl compound. Also, the term "polymer" includes a polymer of a conjugated diene compound; a polymer of a conjugated diene compound and an aromatic vinyl compound; as well as a polymer of an aromatic vinyl compound.

The rubber composition in accordance with the present invention has a rubber component with at least 40 wt % of a polymer chain of a conjugated diene monomer and an aromatic vinyl hydrocarbon monomer wherein said polymer chain has at least one nitrogen-containing group at the end of the polymer or in the polymer chain and a weight average molecular weight of $70 \times 10^4$ to $250 \times 10^4$; 60 to 200 phr of carbon black; and 30 to 250 phr of a process oil and/or 5 to 100 phr of liquid polymer.

The polymer used for the present invention must have a nitrogen atom at the end of the polymer or in the polymer chain. The method to introduce the nitrogen atom into the polymer chain is not critical. For example, a conjugated diene compound and an aromatic vinyl compound are polymerized in a hydrocarbon solvent using a nitrogen-containing lithium compound as an initiator or the active end of the polymer is inodified after a conjugated diene compound and an aromatic vinyl compound are polymerized in a hydrocarbon solvent using an organolithium compound as an initiator.

The nitrogen-containing lithium initiator used for the present invention can be the reaction product of an amine compound and an organolithium compound. The amine compound can be represented as either formula (A) or formula (B):

$$\begin{array}{c} R^1 \\ \phantom{xx}\diagdown \\ \phantom{xxx}NH \\ \phantom{xx}\diagup \\ R^2 \end{array} \quad (A)$$

wherein $R^1$ and $R^2$ may be same or different and each represents an aliphatic hydrocarbon group preferably containing 1 to 20 carbon atoms, an aromatic hydrocarbon group preferably containing 5 to 20 carbon atoms or a cycloaliphatic hydrocarbon group preferably containing 3 to 20 carbon atoms, more preferably, each an aliphatic hydrocarbon group containing 1 to 10 carbon atoms, an aromatic hydrocarbon group containing 5 to 10 carbon atoms or a cycloaliphatic hydrocarbon containing 3 to 10 carbon atoms:

(B)

wherein x is one of the following hydrocarbon groups:

X-I: a saturated group having the formula $(CR^3R^4)_n$;

X-II: a saturated group having the formula $(CR^5R^6)_m\text{-}Y\text{-}(CR^5R^6)_1$ wherein Y is $NR^7$ or O;

X-III: an unsaturated group having a carbon—carbon double bond, preferably having the formula $(CR^3R^4)_n$ or $(CR^5R^6)_m\text{-}Y\text{-}(CR^5R^6)_1$ as described above;

wherein $R^3$, $R^4$, $R^5$, and $R^6$, which may be the same or different, each independently represents a hydrogen atom, an aliphatic hydrocarbon group preferably containing 1 to 10 carbon atoms, an aromatic hydrocarbon group preferably containing 5 to 10 carbon atoms, and a cycloaliphatic hydrocarbon group preferably containing 3 to 10 carbon atoms, $R^7$ is an aliphatic hydrocarbon group preferably containing 1 to 10 carbon atoms, an aromatic hydrocarbon group preferably containing 5 to 10 carbon atoms, and a cycloaliphatic hydrocarbon group preferably containing 3 to 10 carbon atoms, n is an integer between 3 and 20, and m and 1 are each an integer, the sum of which is between 2 and 9.

The amine compounds in accordance with formula (A) used to prepare initiators are compounds which include a secondary amine residue.

Any suitable secondary amide may be used in the present invention. Examples of suitable secondary amines include dimethylamine, diethylamine, dipropylamine, di-n-butylamine, diisobutylamine, dipentylamine, dihexylamine, diheptylamine, dioctylamine, diallylamine, dicyclohexylamine, butylisopropylamine, dibenzylamine, methylbenzylamine, methylhexylamine, ethylhexylamine. Other suitable secondary amines will be apparent to one skilled in the art.

The amine compounds in accordance with formula (B) used to prepare initiators are compounds which include an imine residue.

Any suitable imine compound which forms a nitrogen-containing ring may be used to form the imine residue including:

a) imine compounds having a saturated hydrocarbon group of the formula $(CR_3R^4)_n$ where preferably, $R^3$ and $R^4$ are each a hydrogen atom or an aliphatic hydrocarbon with 1 to 8 carbons, and n is 3 to 15, more preferably, $R^3$ and $R^4$ are each a hydrogen atom or an aliphatic hydrocarbon with 1 to 5 carbons, and n is 3 to 15. Examples of imine compounds in this category include the following: aziridine, azetidine, pyrrolidine, piperidine, 2-methylpiperidine, 3-methylpiperidine, 4-methylpiperidine, 3,5-dimethylpiperidine, 2-ethylpiperidine, hexamethyleneimine, dodecamethyleneimine, heptamethyleneimine and coniine;

b) imine compounds having a saturated hydrocarbon group of the formula $(CR^5R^6)_m\text{-}Y\text{-}(CR^5R^6)_1$ where preferably, $R^5$ and $R^6$ are each a hydrogen atom or an aliphatic hydrocarbon with 1 to 5 carbons, $R^7$ is an aliphatic hydrocarbon with 1 to 5 carbons and the sum of m and 1 is 3 to 5, more preferably, $R^5$ and $R^6$ are each a hydrogen atom, $R^7$ is an aliphatic hydrocarbon with 1 to 5 carbons and the sum of m and 1 is 3 to 5. Examples of imine compounds in this category include the following: morpholine, N-methylpiperazine, N-ethylpiperadine, N-methylimidazolidine, and N-ethylimidazolidine; and c) imine compounds having an unsaturated hydrocarbon group with a carbon—carbon double bond, the unsaturated hydrocarbon group preferably having the formula $(CR^3R^4)_n$ or $(CR^5R^6)_m\text{-}Y\text{-}(CR^5R^6)_1$, as described above. Examples of imine compounds in this category include oxazine, pyrroline, pyrrole, and azepine.

In both formula (A) and formula (B), each secondary amine residue and imine residue may be the same or different. And the initiator used for the polymerization may use a single amine component or a mixture of any combination of these.

Any suitable organolithium compound may be used in the polymerization in accodance with the present invention. For example, the initiator may be: alkyllithiums, such as methyllithium, ethyllithium, propyllithium, n-butyllithium, sec-butyllithium, t-butyllithium, hexyllithium, octyllithium, aryllithiums, such as phenyllithium, tolyllithium, lithiumnaphthylide, alkenyllithiums, such as vinyllithium, propenyllithium, alkylenedilithiums, such as tetramethylenedilithium, pentamethylenedilithiums, hexamethylenedilithium, deamethylenedilithium.

The nitrogen-containing initiator discussed above can easily be made by reacting the same mole equivalent of amine compound and organolithium compound in a hydrocarbon solvent. These can be made separately or in the polymerization reactor right before the polymerization. The latter method is more suitable because it can eliminate a step to prepare an initiator and the initiator obtained which is not stable will be used before it deactivates. In this method, an organo lithium compound is poured into a reactor which contains an amine compound and a monomer.

The amount of the lithium compound may be 0.2 to 30 millimoles per 100 g of total monomer.

Monomers for polymerization in accordance with the present invention include conjugated dienes and vinyl aromatic hydrocarbons.

Any suitable conjugated dienes may be used in the present invention. The conjugated dienes preferably contain 4 to 12 carbon atoms, more preferably, 4 to 8 carbon atoms, such as 1,3 butadiene, isoprene, piperilene, 2,3-dimethyl-1,3-butadiene, 1,3-pentadiene, and octadiene. Preferably, the conjugated diene is 1,3-butadiene. These monomers may be used alone or as a mixture of 2 or more.

Any suitable vinyl aromatic hydrocarbons may be used in the present invention. The vinyl aromatic hydrocarbon preferably is styrene, α-methylstyrene, p-methylstyrene, o-methylstyrene, p-butylstyrene or vinyl naphthalene, and more preferably is styrene.

In the present invention, a silicon compound, a tin compound, a compound having an isocyanate group, and/or a compound having a —CM—N< linkage, where M represents a sulfur atom or an oxygen atom, can be added to the reaction mixture after completing polymerization, as a modifier in an amount of 0 to 3 mole equivalent per charged initiator (which is to be described as "mol.eq./I"), more preferably, 0.5 to 1 mol.eq./I, or can be added when it is desired to quench polymerization or change the molecular structure of the resulting polymer in order to achieve desired properties in an amount of 0.05 to 0.5 mol.eq./I, more preferably, 0.1 to 0.2 mol.eq./I.

Any suitable silicon compound can be used in the present invention including, for example, halogenated silicon compounds such as silicon tetrachloride, halogenated organosilane compound, such as triethylsilane chloride, triphenylsilane chloride and dimethylsilane dichloride.

Any suitable tin compound can be used in the present invention, for example, halogenated tin compounds, such as tin tetrachloride, tin tetrabromide, halogenated organotin compounds, such as diethyltin dichloride, dibutyltin dichloride, tributyltin chloride, diphenyltin dichloride, triphenyltin chloride.

Any suitable compound containing an isocyanate group may be used in the present invention including, for example, aromatic polyisocyanate compounds, such as phenylisocyanate, 2,4-tolylenediisocyanate, 2,6-tolylenediisocyanate, diphenylmethanediisocyanate, naphthalenediisocyanate and dimers or trimers of these compounds.

Any suitable compound containing the —CM—N< linkage described above may be used in the present invention including, for example, amide compounds, such as formamide, N,N-dimethylformamide, acetamide, N,N-dimethylformamide, acetamide, N,N-dimethylaminoacetamide, N,N-dimethyl-N',N'-dimethylaminoacetamide, N,N-dimethylaminoacetamide, N,N-dimethyl-N'-ethylaminoacetamide, acrylamide, N,N-dimethylacrylamide, N,N-dimethylmethacrylamide, nicotinamide, isonicotinamide, picolinic acid amide, N,N-dimethylisonicotinamide, succinic acid amide, phthalic acid amide, N,N,N'N'-tetramethylphthalic acid amide, oxamide, N,N,N'N'-tetramethyloxamide, 1,2-cyclohexanedicarboxyimide, 2-furan carbonic acid amide, N,N-dimethyl-2-furan carboxylic acid amide, quinoline-2-carboxylic acid amide, N-ethyl-N-methyl-quinoline carboxylic acid amide, imide compounds such as succinic imide, N-methylsuccinic imide, maleimide, phthalimide, N-methylphthalimide, lactam compounds such as ε-caprolactam, N-methyl-ε-caprolactam, 2pyrrolidone, N-methyl-2-pyrrolidone, 2-piperidone, N-methyl-2-piperidone, 2quinorlone, N-methyl-2-quinorlone, urea compounds such as urea, N,N'-dimethyl urea, N,N'-diethyl urea, N,N,N',N'-tetramethyl urea, N,N-dimethyl-N', N'-diphenyl urea, N,N'-dimethylethylene urea, carbamic acid derivatives such as methyl carbamate, N,N-dimethyl methyl carbamate, isocyanuric acid derivatives such as isocyanuric acid, N,N',N"-trimethylisocyanuric acid and thiocarbonyl derivatives of corresponding carbonyl compounds. In general, any compound which reacts with the active ends of the polymer can be used as a modifier in accordance with the present invention.

In the present invention, a Lewis base, such as an ether compound, a tertiary amine compound, a hydrogenated alkalis or alkali earth metals, alcohol salts, carboxylic acid salts, sulfonic acid salts, and amine salts can be used as a randomizer in order to prepare a polymer suitable for a particular use. The time of adding Lewis base is not critical.

Any suitable ether compound may be used in the present invention, including, for example, diethylether, dibutylether, tetrahydrofuran, 2-methoxytetrahydrofuran, 2-methoxyethyltetrahydrofuran, dioxane, ethyleneglycoldimethylether, ethyleneglycoldiethylether, diethyleneglycoldiethylether, diethyleneglycoldibutylether, triethyleneglycoldiethylether.

Any suitable tertiary amine compound may be used in the present invention, including, for example, triethylamine, tripropylamine, pyridine, N,N,N',N'-tetramethylethylenediamine, N,N,N',N'-tetraethylethylenediamine, N-methylmorpholine.

Any suitable hydrogenated alkali or alkali earth metal may be used in the present invention, including, for example, Any suitable alcohol salts may be used in the present invention, including, for example, potassium methoxide.

Any suitable carboxylic acid salts may be used in the present invention, including, for example, potassium laurate.

Any suitable sulfonic acid salts may be used in the present invention, including, for example, potassium sulfonate.

Any suitable amine salts may be used in the present invention, including, for example, the potassium salt of dimethylamine.

The amount of Lewis base used is not critical and can be 0.05 to 1000 millimoles per 1 mole of organolithium.

A small amount of allene compounds such as 1,2butadiene may be added in order to prevent gelation.

Any suitable hydrocarbon solvent may be used in the polymerization in accordance with the present invention. For example, the solvents may be: aromatic hydrocarbons such as benzene, toluene, xylene, aliphatic hydrocarbons such as n-pentane, n-hexane, n-butane, cycloaliphatic hydrocarbons such as methylcyclopentane, cyclohexane, or mixtures of these.

The reaction temperature in accordance with the invention is preferably 0° to 150° C.

Polymerization in accordance with the invention can be carried out in a solution or in bulk, batchwise or continuously, or also at constant temperature or adiabatically.

The monomer concentration in the polymerization solvent is preferably 5 to 50 wt %, more preferably, 10 to 35 wt %.

If a mixture of a conjugated diene and an aromatic vinyl hydrocarbon is copolymerized, the aromatic vinyl hydrocarbon monomer is preferably 20 to 50 wt % of the feed monomer, more preferably 30 to 45 wt %, the conjugated diene being the remainder.

Polymerization in accordance with the invention is preferably carried out under high enough pressure, for example 1 to 10 atm., to maintain the system in liquid phase since the reaction starts by contact of the monomer with the initiator in liquid phase. All the additives described above are preferably purified before use.

If polymerization is carried out in solution, solvent may be removed from the polymer after polymerization by steam stripping or drying the polymer solution with hot rollers or reduced pressure with or without previously solidifying the polymers.

Part or all of a softener comprising a process oil or liquid polymer may be added before the solvent is removed as extending oil. Preferably, the amount of the oil is between 30 to 250 parts by weight to 100 parts by weight of polymer, and more preferably, 60 to 150 parts by weight to 100 parts by weight of polymer. When the amount of the process oil is outside of this preferred range, processability is not as good as when it is within the range.

The polymer in accordance with the present invention has, when it is an SBR, for example, 20 to 50 wt %, preferably, 30 to 45 wt %, of bound styrene, and not more than 70%, preferably 30 to 50%, of vinyl content in the butadiene portion. When the bound styrene content is less than 20wt %, breaking properties are deteriorated, and when it exceeds 50% or the vinyl content in the butadiene portion exceeds 70%, the glass transition temperature of the resulting polymer becomes very high and wear strength and low temperature properties are deteriorated. When the bound styrene content becomes less than 25%, breaking properties of the resulting polymer are reduced. And when the vinyl content in the butadiene portion is less than 20%, heat resistance is reduced.

The molecular weight of the polymer in accordance with the present invention is $70 \times 10^4$ to $250 \times 10^4$ preferably, $90 \times 10^4$ to $150 \times 10^4$. If the molecular weight is less than $70 \times 10^4$, breaking strength and wear strength are deteriorated drastically, and if the molecular weight is over $250 \times 10^4$, dispersion of carbon black is poor, which leads to lower breaking strength and lower wear strength.

The polymer in accordance with the present invention can be blended with natural rubber or with another diene rubber to form a rubber composition. Examples of other diene rubbers suitable for blending are a polyisoprene, a solution polymerized SBR, an emulsion polymerized SBR, polybutadienes, an ethylene-propylene-diene polymer, a chloroprene, a halogenated butyl rubber, an acrylonitrile-butadiene rubber (NBR).

The content of the polymer in accordance with the present invention is 40 to 100 wt %, a natural rubber or another diene rubber being the remainder. If the content of the polymer in accordance with the present invention is less than 40 wt %, that is, the amount of the other natural or diene rubber is more than 60 wt %, no significant improvement in properties of the vulcanizates can be observed.

The amount of carbon black used in the rubber composition in accordance with the present invention is 60 to 200 parts by weight per 100 parts by weight of rubber. If the amount of carbon black is less than 60 wt %, tensile strength is too low, and if the same is over 200 wt %, wear strength and processability are too low. Preferably, the carbon black has 100 $m^2$/g or more of a nitrogen absorbing surface area ($N_2$ SA), 100 to 170 ml/100 g of DBP, which include HAF, ISAF, SAF. If the $N_2$ SA of the carbon black is less than 100 $m^2$/g, breaking strength and wear strength of the vulcanites obtained are low.

Further, a softener comprising 30 to 250 parts by weight of a process oil and/or 5 to 100 phr of liquid polymer is added.

Suitable process oils include, for example, paraffinic, naphthenic, aromatic process oils, and the like. Preferably, the process oils is an aromatic oil.

The amount of the process oils used is 30 to 250 phr, preferably, 60 to 150 phr. If the amount of the process oil exceeds 250 phr, the tensile strength of the vulcanite declines drastically and processability also declines.

The liquid polymer may be liquid polybutadiene rubber, liquid polyisoprene rubber, liquid butadiene-styrene rubber, and the like. Preferably, the liquid polymer is liquid SBR.

The amount of the liquid polymer used in the present invention is 5 to 100 phr. If the amount of liquid polymer exceeds 100 phr, the itensile strength of the vulcanite declines drastically and processability also declines. If the same is less than 5 phr, processability declines.

To prepare vulcanized rubber compositions of the present invention, 0.1 to 5 phr, preferably 1 to 2 phr of sulfur can be used. If the amount of sulfur is less than 0.1 phr, tensile strength, wear strength, and hysteresis loss property of the vulcanite are reduced, and if more than 5 phr of sulfur is used, the vulcanite loses some of its elasticity.

Any suitable accelerator may be used in accordance with the present invention. Preferably, the accelerator is a thiazole type accelerator, such as 2-mercaptobenzothiazole (M), dibenzothiazyldisulfide (DM), and N-cyclo-hexyl-2-benzothiazylsulfenamide (CZ), or guanidine type accelerators such as diphenylguanidine (DPG).

The amount of the accelerator is preferably 0.1 to 5 phr, more preferably, 0.2 to 3 phr.

Besides conventional antioxidants or carbon black, fillers and additives, such as silica, calcium carbonate, titanium oxide, zinc oxide, stearic acid, and antiozonants can be included in the rubber composition in accordance with the present invention.

The rubber composition in accordance with the present invention can be prepared by using a mixer, such as a roll mixer, or an internal mixer. The resulting composition can be molded into tire parts, such as a tread, an under tread, a carcass, a side wall, and a bead, or other industrial materials, such as a rubber vibration isolator, and a hose. It can most suitably be used as a tire tread.

The present invention will be explained through examples but is not restricted by these examples.

In the examples, parts and percentages are by weight unless noted otherwise.

Measurements were made as follows:

The number average molecular weight of the polymers were measured by gel permeation chromatography (G.P.C. HLC-8020 manufactured by Toisoh Corporation with a series of two GMH-XL type columns) and calculated by differential refractive index (RI) and UV absorption at 254 nm reduced to polystyrene. A monodispersed styrene was used as a standard.

Microstructures of a polyconjugated diene or the conjugated diene portion of a conjugated diene-aromatic vinyl hydrocarbon polymer were measured by the infrared method according to D. Morero, *Chem. e. Ind.*, Vol. 41, Page 758 (1959). The styrene content was obtained from the absorption intensity of the aromatic hydrogens by NMR spectroscopy.

The breaking properties were measured according to Japanese Industrial Standard K6301. The tensile strength and elongation were used as the factors.

The tensile properties were measured according to Japanese Industrial Standard K6301. The tensile strength and elongation at 100° C. was used as the factors.

As a standard for grip properties, tanα, which is an index for heat generation, was used. To measure tanα an apparatus for measurement of viscoelasticity (manufactured by Rheometrix Co.) was used. The conditions under which the measurements were carried out include a temperature of 50° C., strain at 5%, and frequency at 15 Hz.

Wear strength was measured with a DIN abrasion tester at room temperature ann data is shown in comparison to a control.

The Mooney viscosity was measured as a standard for processability and producibility. Measurement was carried out, with the polymers before compounding, at 100° C. and with the compounded compositions, at 130° C., after 1 minute of preheating and 4 minutes of stirring at the measuring temperature. The processability was represented as levels from 1 to 5, with 5 being the best. By determining Mooney viscosity, the adhesiveness toward the mixer can be evaluated.

EXAMPLE 1

25% styrene solution in 700 g of cyclohexane and 15% 1,3-butadiene solution in 2170 g of cyclohexane, were fed into a pressure resistant 5 liter reactor including a stirring device and heating jacket. After the temperature in the reactor reached 50° C. 12 1 g of tetrahydrofuran, 0.28 g of hexamethyleneimine, and 0.2 g of n-butyllithium were added to start polymerization.

Polymerization was carried out for about 2 hours in a temperature range of 50° to 80° C. After the polymerization was completed, the polymer was modified with 0.13 g of silicon tetrachloride for about 1 hour. 60 parts of aromatic oil were added to the solution mixture, then solvent was removed from the mixture and the mixture was dried in a conventional manner to obtain polymer A. The properties of the resulting polymer A are shown in Table 1.

Polymer A was formulated into a rubber composition in accordance with the present invention and using the ingredients shown in Table 2 without blending with other rubbers, then vulcanized at 145° C. for 33 min. The properties of the resulting rubber composition are shown in Table 4.

EXAMPLE 2

The monomer solution was prepared by the same method as in Example 1. 30 minutes after the temperature in the reactor reached 50° C., 6.0 g of tetrahydrofuran, 0.14 g of hexamethyleneimine, and 0.1 g of n-butyllithium were added to start polymerization.

Polymerization was carried out for about 3 hours in a temperature range of 30° to 50° C. After the polymerization was completed, an excess amount of isopropanol was added to quench polymerization. 60 parts of aromatic oil were added to the solution mixture, then solvent was removed from the mixture and the mixture was dried in a conventional manner to obtain polymer B. The properties of the resulting polymer B are shown in Table 1.

Polymer B was formulated into a composition by the same method as in Example 1. The properties of the resulting rubber composition are shown in Table 4.

EXAMPLE 3

Example 3 was carried out in the same manner as Example 1, except that 0.0020 g of t-amyloxypotassium (t-AmOK) was added instead of 12.1 g of tetrahydrofuran to obtain polymer C. The properties of the resulting polymer and rubber composition obtained therefrom are shown in Table 1, and Table 4, respectively.

EXAMPLES 4 AND 5

Examples 4 and 5 Here carried out in the same manner as Example 1 except that 0.24 g of benzylamine and 0.24 g of morpholine were added instead of 0.28 g of hexamethyleneimine to obtain polymers D and E, respectively. The properties of the resulting polymers, D and E, and the rubber compositions obtained therefrom are shown in Table 1 and Table 4, respectively.

COMPARATIVE EXAMPLE 1

Comparative Example 1 was carried out in the same manner as Example 2, except that the amounts of tetrahydrofuran, hexamethyleneimine, and n-butyllithium were changed to 7.9 g, 0.18 g and 0.13 g, respectively to obtain polymer F. The properties of the resulting polymer F and rubber composition obtained therefrom are shown in Table 1 and Table 4, respectively.

COMPARATIVE EXAMPLE 2

Comparative Example 2 was carried out in the same manner as in Example 1, except that no hexamethyleneimine was added to obtain polymer G. The properties of the resulting polymer and rubber composition obtained therefrom are shown in Table 1 and Table 4, respectively.

EXAMPLES 6, 7, 8, 9 AND 10

The Mooney viscosity of polymers A, B, C., D and E, obtained from Examples 1, 2, 3, 4 and 5, respectively, were measured, and then the polymers were formulated into rubber compositions in accordance with the present invention using the formulations shown in Table 3 without blending with other rubbers. The rubber compositions were vulcanized at 145° C. for 33 min. The properties of the resulting vulcanites are shown in Table 4. The amounts of oil in Table 3 include the extending oil which had been incorporated into the polymer.

The properties of resulting rubber compositions and the vulcanites therefrom are shown in Table 5.

COMPARATIVE EXAMPLES 3 AND 4

Comparative Examples 3 and 4 were carried out in the same manner as in Examples 6 to 10, except that polymers F and G were used instead of polymers A to E, respectively.

The properties of the resulting rubber compositions and the vulcanites obtained therefrom are shown in Table 5.

TABLE 1

| | | Molecular Weight | | Micro Structures | |
| | | | | Vinyl content in the butadiene | Bound |
| | Polymers | Mw (× 10⁴) | Mw/Mn | portion (%) | Styrene (wt %) |
|---|---|---|---|---|---|
| E 1 | A | 111 | 1.91 | 40 | 33 |
| E 2 | B | 95 | 1.85 | 41 | 35 |
| E 3 | C | 85 | 1.67 | 42 | 36 |
| E 4 | D | 105 | 1.72 | 41 | 35 |
| E 5 | E | 99 | 1.75 | 40 | 35 |
| CE 1 | F | 63 | 1.75 | 40 | 34 |
| CE 2 | G | 98 | 1.72 | 40 | 35 |

Notes:
Vinyl content was calculated based upon a total butadiene content of 100%.
Molecular weights were reduced to styrene.
E: Example
CE: Comparative Example
Mw: weight average molecular weight
Mn: number average molecular weight

TABLE 2

| SBR | 100 parts |
|---|---|
| Carbon Black (ISAF) | 90 |
| Aromatic Oil | 60 |
| Stearic acid | 1 |
| Antioxidant*¹ | 1 |
| ZnO2 | 2.5 |
| Antioxidant*² | 0.2 |
| Accelerator*³ | 0.2 |
| Accelerator*⁴ | 0.6 |
| Sulfur | 1.8 |

Notes:
*¹N-(1,3-dimethyl-butyl)-N'-Phenyl-p-phenylene diamine
*²Mixed diaryl-p-phenylene diamine
*³1,3-diphenylguanidine
*⁴Tetramethyl thiuramdisulfide

TABLE 3

| SBR | 100 parts |
|---|---|
| Carbon Black (ISAF) | 100 |
| Aromatic Oil | 120 |
| Stearic acid | 2 |
| Antioxidant*¹ | 1 |
| ZnO2 | 3 |
| Antioxidant*² | 0.5 |
| Accelerator*³ | 0.2 |
| Accelerator*⁴ | 0.8 |
| Sulfur | 1.2 |

Notes:
*¹N-(1,3-dimethyl-butyl)-N'-Phenyl-p-phenylene diamine
*²Mixed diaryl-p-phenylene diamine
*³1,3-diphenylguanidine
*⁴Tetramethyl thiuramdisulfide

TABLE 4

| | | Elongation (%) | | Tensile strength (Kgf/cm²) | | tanδ | DIN wear |
| | Polymers | R.T. | H.T. | R.T. | H.T. | 50° C. | strength |
|---|---|---|---|---|---|---|---|
| E 1 | A | 441 | 267 | 271 | 96 | 0.439 | 113 |
| E 2 | B | 440 | 272 | 273 | 99 | 0.433 | 114 |
| E 3 | C | 430 | 305 | 251 | 109 | 0.427 | 113 |
| E 4 | D | 444 | 288 | 270 | 112 | 0.430 | 115 |
| E 5 | E | 450 | 290 | 269 | 110 | 0.441 | 117 |
| CE 1 | F | 465 | 298 | 221 | 72 | 0.455 | 82 |
| CE 2 | G | 449 | 271 | 259 | 92 | 0.387 | 100 |

Notes:
DIN wear strength was calculated based upon Comparative Example 2 having an index of 100.
E: Example
CE: Comparative Example
R.T.: room temperature (20° C.)
H.T.: high temperature (100° C.)

TABLE 5

| | | Elongation (%) | | Tensile strength (kgf/cm²) | | tanδ | ML 1 + 4⁽¹⁾ | | |
| | Polymers | R.T. | H.T. | R.T. | H.T. | 50° C. | 100° C.⁽²⁾ | 130° C.⁽³⁾ | P⁽⁴⁾ |
|---|---|---|---|---|---|---|---|---|---|
| E 6 | A | 750 | 585 | 160 | 80 | 0.485 | 44 | 78 | 113 |
| E 7 | B | 738 | 565 | 162 | 85 | 0.490 | 46 | 83 | 114 |
| E 8 | C | 706 | 524 | 150 | 71 | 0.475 | 35 | 85 | 113 |
| E 9 | D | 725 | 552 | 155 | 76 | 0.490 | 40 | 79 | 115 |
| E 10 | E | 722 | 589 | 166 | 82 | 0.498 | 43 | 82 | 117 |
| CE 1 | F | 856 | 711 | 101 | 55 | 0.512 | 25 | 65 | 82 |
| CE 2 | G | 729 | 614 | 131 | 68 | 0.494 | 37 | 46 | 100 |

Notes:
⁽¹⁾: Mooney viscosity
⁽²⁾: Mooney viscosity of polymers before compounding with 60 phr of aromatic oil
⁽³⁾: Mooney viscosity of compounded composition
⁽⁴⁾: Processability
E: Examples
CE: Comparative Example
R.T.: room temperature (20° C.)
H.T.: high temperature (100° C.)

Polymers in accordance with the present invention, which were prepared and/or used in Examples 1 to 10, were prepared by using a nitrogen-containing lithium compound as an initiator, and had a high molecular weight of 70×10⁴ or more. As shown in Table 4 and Table 5, the rubber compositions obtained therefrom have much improved breaking properties at both high and low temperatures compared to those of polymers not having any nitrogen atom in the polymer chain (Comparative Example 2 and 4).

The rubber compositions obtained from polymers with low molecular weights (Comparative Examples 1 and 3) also did not improve the properties enough. From these results, to improve the breaking properties, the polymers must have a high molecular weight.

Table 2 shows a conventional compounding formulation for high performance tires, and Table 3 shows a compounding formulation mainly used for racing tires.

When a rubber composition is formulated in accordance with Table 2, as shown in Table 4, tensile strength at high temperature and DIN Wear strength improved compared to Comparative Example 2. The mechanism is not clear yet, but the interaction between the nitrogen atom in the polymer chain and carbon black seems to be important. As described above, the rubber compositions in accordance with the present invention show good wear strength, good breaking properties and good grip properties, and are suitable for high performance tires.

When a rubber composition is formulated in accordance with Table 3, as shown in Table 5, tensile strength was improved compared to the Comparative Examples, and although the Mooney viscosity of the polymer at 100° C. was about the same as that of the rubber composition in Comparative Example 4, the Mooney viscosity of the compounded composition at 130° C. was much higher, which results in better processability compared to that of the rubber composition which was formulated in accordance with Comparative Example 4 using a polymer with a similar molecular weight. From these results, it is clear that the nitrogen atom in the polymer chain, even when the polymer has a high molecular weight, improves processability and workability in the presence of a large amount of oil. Thus the rubber compositions in accordance with the present invention are suitable for race tires.

This is a tendency which can be seen in all cases without any connection to the types of secondary amines (Examples 1, 4 and 5).

The rubber compositions in accordance with the present invention can improve processability and grip properties at the same time in a wide range so that a tire suitable for a particular need can be provided.

While the invention has been described in detail and with reference to specific embodiments thereof, it will be apparent to one skilled in the art that various changes and modifications can be made therein without departing from the spirit and scope thereof.

What is claimed is:

1. A rubber composition for high performance pneumatic tires comprising a rubber component comprising:

at least 40 wt % of a polymer chain of a conjugated diene monomer and/or an aromatic vinyl hydrocarbon monomer, wherein said polymer chain has at least one nitrogen-containing group in or at the end of the polymer chain and a weight average molecular weight of 70×10⁴ to 250×10⁴;

60 to 200 parts by weight of carbon black per 100 parts by weight of rubber (phr); and a softener comprising 30 to 250 phr of a process oil and/or 5 to 100 phr of a liquid polymer, wherein the nitrogen atom of the nitrogen-containing group in or at the end of the polymer chain is introduced in or at the end of the polymer chain by polymerizing the conjugated diene monomer and/or aromatic vinyl hydrocarbon monomer with a nitrogen-containing lithium compound as an initiator, wherein the nitrogen-containing lithium compound is the reaction product of an organolithium compound and an amine compound represented by formula (B):

wherein X is selected from the group consisting of:
   X-I: a saturated group having the formula $(CR^3R^4)_n$;
   X-II: a saturated group having the formula $(CR^5R^6)_m$-Y-$(CR^5R^6)_l$ wherein Y is $NR^7$ or O; and
   X-III: an unsaturated group having a carbon—carbon double bond;
   wherein $R^3$, $R^4$, $R^5$ and $R^6$ each independently represents a hydrogen atom, an aliphatic group, an aromatic hydrocarbon group, or a cycloaliphatic hydrocarbon group; $R^7$ is an aliphatic hydrocarbon group, an aromatic hydrocarbon group, or a cycloaliphatic hydrocarbon group; n is an integer between 3 and 20; and m and l are each an integer, the sum of which ms from 2 to 9.

2. The rubber composition of claim 1, wherein the unsaturated group having a C—C double bond in the formula (B) is represented by $(CR^3R^4)_n$ or $(CR^5R^6)_m$-Y-$(CR^5R^6)_y$.

3. The rubber composition according to claim 1, wherein $R^3$, $R^4$, $R^5$, and $R^6$ each represents a hydrogen atom, an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms, $R^7$ represents an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms.

4. The rubber composition according to claim 1, wherein $R^3$ and $R^4$ each represents a hydrogen atom or an aliphatic hydrocarbon group containing 1 to 8 carbon atoms, and n is 3 to 20.

5. The rubber composition according to claim 1, wherein $R^3$ and $R^4$ each represents a hydrogen atom or an aliphatic hydrocarbon group containing 1 to 5 carbon atoms, and n is 3 to 15.

6. The rubber composition according to claim 1, wherein $R^5$ and $R^6$ each represents a hydrogen atom or an aliphatic hydrocarbon group containing 1 to 5 carbon atoms, $R^7$ represents an aliphatic hydrocarbon group containing 1 to 5 carbon atoms, and the sum of m and i is 3 to 5.

7. The rubber composition according to claim 1, wherein $R^5$ and $R^6$ each represents a hydrogen atom, and $R^7$ represents an aliphatic hydrocarbon group containing 1 to 5 carbon atoms, and the sum of m and i is 3 to 5.

8. The rubber composition according to claim 1, wherein the organolithium compound used for the initiator is n-butyllithium or t-butyllithium.

9. The rubber composition according to claim 1, wherein the amine compound used for the initiator is hexamethyleneimine, methylbenzylamine, or morpholine.

10. The rubber composition according to claim 1, wherein the initiator is a reaction product of n-butyllithium and hexamethyleneimine.

11. The rubber composition according to claim 1, wherein the conjugated diene monomer is butadiene.

12. The rubber composition according to claim 1, wherein the conjugated diene monomer is butadiene and the aromatic vinyl hydrocarbon monomer is styrene.

13. The rubber composition according to claim 1, wherein the polymer is further modified during or after polymerization with at least one modifier selected from the group consisting of a silicon compound, a tin compound, a compound having an isocyanate group, and a compound having a —CM-N< linkage, where M represents a sulfur atom or an oxygen atom.

14. The rubber composition according to claim 13, wherein the modifier is a compound selected from the group consisting of a halogenated tin compound, a halogenated organotin compound, an aromatic polyisocyanate compound, an amide compound, an imide compound, a lactam compound, a urea compound, a carbamic acid derivative, an isocyanuric acid derivative, and athiocabonyl compound.

15. The rubber composition according to claim 13, wherein the modifier is a compound selected from the group consisting of tin tetrachloride, dibutyltin dichloride, tributyltin chloride, phenylisocyanate, formamide, succinic imide, $\epsilon$-caprolactam, urea, carbamic acid, and isocyanuric acid.

16. The rubber composition according to claim 1, wherein the softner comprising process oil and/or liquid polymer is present in an amount of 60 to 150 phr.

17. The rubber composition according to claim 1, wherein the carbon black used has a nitrogen absorbing surface area ($N_2SA$) of not less than 100 m/g and the amount 2 of absorbed dibutyl phthalate oil (DBP) of 100 to 170 ml/100 g.

18. The rubber composition according to claim 1, wherein the process oil is an aromatic process oil.

19. The rubber composition according to claim 1, wherein the liquid polymer is a liquid styrene-butadiene polymer.

20. The rubber composition according to claim 1, wherein the initiator is a reaction product of n-butyllithium and dodecamethyleneimine.

21. The rubber composition according to claim 1, wherein, after the conjugated diene monomer, the aromatic vinyl hydrocarbon monomers or a mixture thereof is polymerized, the nitrogen atom of a nitrogen-containing group is introduced at the end of the polymer chain by modifying the active end of the polymer using an organolithium compound as an initiator.

* * * * *